(12) United States Patent
Hara

(10) Patent No.: US 7,409,697 B2
(45) Date of Patent: Aug. 5, 2008

(54) ELECTRONIC APPARATUS INCLUDING DISK DEVICE

(75) Inventor: Hirotoshi Hara, Echizen (JP)

(73) Assignee: Orion Electric Co., Ltd., Fukui (JP)

( * ) Notice: Subject to any disclaimer, the term of this patent is extended or adjusted under 35 U.S.C. 154(b) by 336 days.

(21) Appl. No.: 11/274,147

(22) Filed: Nov. 16, 2005

(65) Prior Publication Data

US 2006/0112404 A1 May 25, 2006

(30) Foreign Application Priority Data

Nov. 24, 2004 (JP) .............................. 2004-339494

(51) Int. Cl.
*G11B 17/028* (2006.01)
(52) U.S. Cl. ..................................................... 720/710
(58) Field of Classification Search ................. 720/710, 720/703, 715, 652, 603, 619, 601, 612, 604
See application file for complete search history.

(56) References Cited

U.S. PATENT DOCUMENTS

| 6,292,456 B1 | 9/2001 | Huang et al. |
| 2007/0050785 A1* | 3/2007 | Osaki ........................ 720/604 |

FOREIGN PATENT DOCUMENTS

| EP | 1 528 551 A2 | 5/2005 |
| JP | 09-180330 A | 7/1997 |
| JP | 2002-25159 A | 1/2002 |
| JP | 2003-317351 | 11/2003 |
| KR | 2002-0027788 A | 4/2002 |

OTHER PUBLICATIONS

Office Action dated Dec. 10, 2007 issued in corresponding European Application No. 05257171.8, in English.

* cited by examiner

*Primary Examiner*—Allen T Cao
(74) *Attorney, Agent, or Firm*—Westerman, Hattori, Daniels & Adrian, LLP.

(57) ABSTRACT

The invention provides increased stroke of the clamper and a reduction in thickness of the entire disk device by improving structures of a clamper for clamping the recording medium to turn freely and a clamper plate engaging with the clamper. Plural connecting sections that connect an inner torus and an outer torus, plural L-shaped hook sections at an upper end of an inner rim wall of substantially a cylindrical shape extended upward from a border of the connecting sections and the outer torus, and an outer rim wall of substantially a cylindrical shape extended upward from the outer torus are integrally formed on a clamper body. Engaging holes engaging with the L-shaped hook sections are provided in a clamper plate. A step section, an outer peripheral side of which is high, is provided in a position where an upper end of the outer rim wall collides with the clamper plate.

6 Claims, 10 Drawing Sheets

− Prior Art −

− Prior Art −

190

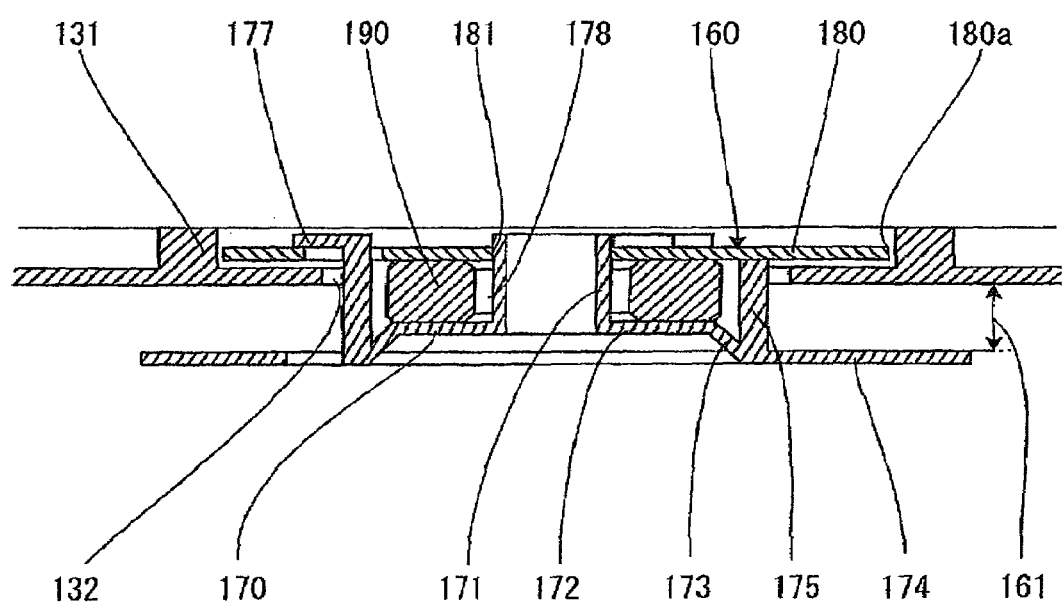
FIG. 10 — Prior Art —

ELECTRONIC APPARATUS INCLUDING DISK DEVICE

The present application is based on and claims priority of Japanese patent application No. 2004-339494 filed on Nov. 24, 2004, the entire contents of which are hereby incorporated by reference.

BACKGROUND OF THE INVENTION

1. Field of the Invention

The present invention relates to an electronic apparatus including a disk device that rotates a disk-like recording medium in the apparatus to perform reading and writing of information, and, in particular to a clamper structure that increases a stroke of a clamper, which is arranged in a position opposed to a turntable for rotating a recording medium and clamps the recording medium such that the recording medium turns freely, and realizes a reduction in thickness of the entire disk device.

2. Description of the Related Art

Conventionally, a clamper that is mounted on a turntable and clamps a recording medium from above is arranged in a disk device. A clamper 160 shown in FIG. 10 is supported by a clamper support section 131, which is formed in an upper part of a not-shown frame, to turn freely and includes a clamper body 170 formed of resin, a clamper plate 180 of substantially a disk shape formed of metal, and a magnet 190 that assumes a flat ring shape and is housed in the clamper body to attract a metal surface of a not-shown turntable. On the clamper body 170 shown in FIG. 7, a guide section 171 of substantially a cylindrical shape that pierces through a through-hole 181 of the flat clamper plate 180 shown in FIG. 9 and guides a position of the clamper body 170, an inner torus 172 formed from the guise section 171 toward the periphery of the clamper body 170, a planar connecting section 173 extending aslant around the inner torus 172, an outer torus 174 formed around the connecting section 173, a rim wall 175 of substantially a cylindrical shape extended upward from a boundary of the outer torus 174 and the connecting section 173, and L-shaped hook sections 177 in three places that are formed at an upper end of the rim wall 175 and engage with the clamper plate 180 are integrally formed around a rotational axis of the clamper body 170. A space between the guide section 171 and the rim wall 175 is used as a magnet housing section 178. The inner torus 172 and the outer torus 174 are formed with a step. The connecting section 173 connecting the inner torus 172 and the outer torus 174 is formed aslant upward to the magnet housing section 178 that houses the magnet 190 shown in FIG. 8. The through-hole 181, through which the guide section 171 provided in the clamper body 170 pierces, and engaging holes 183 in three places, with which the L-shaped hook sections 177 engage, are formed on the clamper plate 180. Consequently, the magnet 190 is housed in the magnet housing section 178 formed in the clamper body 170. The guide section 171 pierces through the through-hole and the clamper plate 180 is assembled to the clamper body 170 and engaged by the L-shaped hook sections 177.

In such a disk device, concerning a disk clamper that clamps an optical disk, for example, as a related art, in Japanese Patent Application Laid-open No. 2003-317351 (patent document 1), the disk clamper is set rotatably on a top plate of a device body of the disk device and the disk clamper is set with clearance to be movable in all directions in a radial direction thereof. A body section of the disk clamper is loosely fit in a substantially circular opening formed in the top plate. The opening is formed in a shape surrounded by an ark and a segment and a radius of the opening is reduced in a part on a rear side. Consequently, in a method disclosed in the patent document 1, a clearance amount in a rear part of the disk clamper is set smaller than clearance amounts in the other directions to prevent damages even if an impact acts on the disk clamper.

SUMMARY OF THE INVENTION

In a clamper 160 in the related art, since a flat clamper plate 180 formed of metal is die-cut by a press die, burrs in a thickness direction tend to be formed in a rim surface of the clamper plate 180. When the clamper plate 180 with the burrs comes into contact with a clamper support section 131, the clamper support section 131 formed of resin rubs against the burrs to be shaved and fine powder is formed. The fine powder adheres to a lens of a not-shown pickup to scatter light. Thus, there is a problem in that it is impossible to read fine signal bits formed on a surface of a not-shown recording medium. Attention has been paid to always assemble the clamper plate 180, which is flat and can be assembled with a front and a rear thereof reversible, by designating the front and the rear such that a burr rim surface 180a, on which burrs are formed, does not come into contact with the clamper support section 131 in assembling the clamper 160. However, L-shaped hook sections 177 can be inserted into engaging holes 183, a front and a rear of which are reversed. Thus, there is a problem in that the L-shaped hook sections 177 are inserted from the wrong side by mistake. Even if the L-shaped hook sections 177 are assembled regularly, the L-shaped hook sections 177 stick out from a surface of the clamper plate 180 by thickness thereof. Thus, there is a problem in that thickness of the disk device increases by the thickness of the L-shaped hook sections 177. Depth of a magnet housing section 178, in which a magnet 190 is housed, is formed to be larger than thickness of the magnet 190 taking into account fluctuation in the thickness of the magnet 190 that varies subtly depending on an individual magnet. Thus, there is also a problem in that, when the magnet 190 with rather small thickness is housed in the magnet housing section 178, the magnet 190 moves up and down to generate odd sound every time the turntable moves up and down relatively to the clamper 160 to clamp or release the recording medium. In order to reduce thickness of a not-shown disk device, it is inevitable to reduce a stroke 161, which allows the clamper 160 to move up and down via the clamper support section 131, by reducing a gap between the outer torus 174 of a clamper body 170 and the clamper plate 180. Thus, there is a problem in that, in order to prevent the stroke 161 from being reduced, thickness of an opening 132 of the clamper support section 131 arranged in a not-shown frame is reduced. The invention is devised to obtain an electronic apparatus including a disk device that, in the related art, prevents the L-shaped hook sections 177 from being inserted into the clamper plate by mistaking the front and the rear of the clamper plate, solves the problem in that thickness of the disk device increases by thickness of the L-shaped hook sections 177 formed in the clamper body 170, the problem in that it is inevitable to reduce thickness of the clamper support section 131 in order to prevent the stroke 161 for moving up and down the clamper 160 from being reduced, and the problem in that odd sound is generated by movement of the magnet 190 housed in the magnet housing section 178, prevents wrong insertion of the clamper plate 180, allows a reduction in thickness of the disk device, allows an increase in thickness of the opening 132 of the clamper support section 131, and can control movement of the magnet 190 to prevent generation of odd sound.

An electronic apparatus including a disk device in claim 1 is an electronic apparatus including a disk device including: a tray that conveys a disk-like recording medium to the inside and the outside of the device; a frame of a device body that houses the tray; a turntable that rotates while supporting the recording medium conveyed to the inside of the device together with the tray from below; a clamper support section that is formed in an upper part of the frame to be opposed to the turntable; and a clamper that loosely fits in the clamper support section to turn freely, the disk device rotating the recording medium, which is conveyed to the inside of the device by the tray, to perform reading and writing of information in a state in which the recording medium is clamped by the turntable and the clamper, characterized in that the clamper includes: a clamper body formed of resin; a clamper plate of substantially a disk shape formed of metal; and a magnet that is housed in the clamper body and attracts a metal surface of the turntable, and a magnet housing section for housing the magnet, engaging means that engages with the clamper plate, and movement preventing means for the magnet housed in the magnet housing section are integrally formed on the clamper body.

According to the constitution in claim 1, in the electronic apparatus including a disk device including: a tray that conveys a disk-like recording medium to the inside and the outside of the device; a frame of a device body that houses the tray; a turntable that rotates while supporting the recording medium conveyed to the inside of the device together with the tray from below; a clamper support section that is formed in an upper part of the frame to be opposed to the turntable; and a clamper that loosely fits in the clamper support section to turn freely, the disk device rotating the recording medium, which is conveyed to the inside of the device by the tray, to perform reading and writing of information in a state in which the recording medium is clamped by the turntable and the clamper, the clamper includes: a clamper body formed of resin; a clamper plate of substantially a disk shape formed of metal; and a magnet that is housed in the clamper body and attracts a metal surface of the turntable, and a magnet housing section for housing the magnet, engaging means that engages with the clamper plate, and movement preventing means for the magnet housed in the magnet housing section are integrally formed on the clamper body. Consequently, it is unnecessary to provide the movement preventing means for the magnet separately from the members constituting the clamper.

An electronic apparatus including a disk device in claim 2 is characterized in that, in the electronic apparatus including a disk device according to claim 1, a guide section of substantially a cylindrical shape that pierces through the clamper plate and guides a position of the clamper plate, an inner torus that is formed from the guide section toward the periphery of the clamper body, and an inner rim wall of substantially a cylindrical shape extending upward from the inner torus are formed around a rotation axis of the clamper body as the magnet housing section.

According to the constitution in claim 2, a guide section of substantially a cylindrical shape that pierces through the clamper plate and guides a position of the clamper plate, an inner torus that is formed from the guide section toward the periphery of the clamper body, and an inner rim wall of substantially a cylindrical shape extending upward from the inner torus are formed around a rotation axis of the clamper body as the magnet housing section. Consequently, it is possible to easily assemble the clamper body and the clamper plate that are guided by the guide section and the through-hole. It is possible to arrange the magnet, which is arranged in the magnet housing section, in a predetermined position that has the inner torus as a bottom surface and is surrounded by the guide section and the inner rim wall.

An electronic apparatus including a disk device in claim 3 is characterized in that, in the electronic apparatus including a disk device according to claim 2, the inner torus, plural connecting sections extending radially from the inner torus, and an outer torus formed around the connecting sections are integrally formed, the inner torus and the outer torus are formed with a step, the connecting sections are formed aslant upward from the outer torus toward the inner torus, and depth of the magnet housing section is formed smaller than thickness of the magnet to form movement preventing means for the magnet.

According to the constitution in claim 3, the inner torus, plural connecting sections extending radially from the inner torus, and an outer torus formed around the connecting sections are integrally formed, the inner torus and the outer torus are formed with a step, the connecting sections are formed aslant upward from the outer torus toward the inner torus, and depth of the magnet housing section is formed smaller than thickness of the magnet to form movement preventing means for the magnet. Consequently, the plural connecting sections aslant upward can have a spring property. Thus, the magnet is pressed into and housed in the magnet housing section formed shallow. After the clamper plate is assembled to the clamper body, the magnet can maintain a state in which the magnet is pressed against the clamper plate by the connecting sections having the spring property.

An electronic apparatus including a disk device in claim 4 is characterized in that, in the electronic apparatus including a disk device according to claim 3, an inner rim wall of substantially a cylindrical shape extended upward from a boundary of the outer torus and the connecting sections, an outer rim wall of substantially a cylindrical shape extended upward from an inner side of the outer torus, and plural L-shaped hook sections at an upper end of the inner rim wall are integrally formed on the clamper body, and a through-hole through which a guide section provided in the clamper body pierces and plural engaging holes with which the L-shaped hook sections engage are formed in the clamper plate to form engaging means for the clamper plate.

According to the constitution in claim 4, an inner rim wall of substantially a cylindrical shape extended upward from a boundary of the outer torus and the connecting sections, an outer rim wall of substantially a cylindrical shape extended upward from an inner side of the outer torus, and plural L-shaped hook sections at an upper end of the inner rim wall are integrally formed on the clamper body, and a through-hole through which a guide section provided in the clamper body pierces and plural engaging holes with which the L-shaped hook sections engage are formed in the clamper plate to form engaging means for the clamper plate. Consequently, the clamper plate can cause the guide sections formed in the clamper body to pierce through the through-hole and insert the L-shaped hook sections through the engaging holes. The magnet housed in the magnet housing section is always pressed against the clamper plate by the plural connecting sections having the spring property and the engaged clamper plate and can maintain a movement prevented state.

An electronic apparatus including a disk device in claim 5 is characterized in that, in the electronic apparatus including a disk device according to claim 4, in the clamper plate, a step section, an outer peripheral side of which is high upward, is formed in a position where an upper end of the outer rim wall of the clamper body collides with the clamper plate.

According to the constitution in claim 5, in the clamper plate, a step section, an outer peripheral side of which is high upward, is formed in a position where an upper end of the outer rim wall of the clamper body collides with the clamper plate. Consequently, when the clamper plate is assembled with the clamper body with the step formed in the clamper pate, even if it is attempted to insert the clamper body with the front and the rear thereof reversed, the step section collides with an end of the outer rim wall earlier to make it impossible to engage the L-shaped hook sections. Thus, it is possible to prevent the clamper body from being attached with the front and the rear thereof reversed.

An electronic apparatus including a disk device in claim 6 is characterized in that, in the electronic apparatus including a disk device according to claim 5, the step section of the clamper plate is formed larger than thickness of the L-shaped hooks formed in the clamper body.

According to the constitution in claim 6, the step section of the clamper plate is formed larger than thickness of the L-shaped hooks formed in the clamper body. Consequently, after the clamper body is assembled, at least a stroke equivalent to thickness of the L-shaped hook sections increases. Therefore, it is possible to increase thickness of the clamper support section by an amount equivalent to the increase in the stroke, that is, an amount equivalent to the thickness of the L-shaped hook sections. The L-shaped hooks are lower than an upper surface of the clamper plate. Thus, it is possible to reduce thickness of the disk device by at least thickness of the L-shaped hooks.

BRIEF DESCRIPTION OF THE DRAWINGS

FIG. 10 is a sectional explanatory view showing the conventional clamper and a clamper support section.

DETAILED DESCRIPTION OF THE PREFERRED EMBODIMENTS

As described above, the invention essentially increases a stroke of a clamper and realizes a reduction in thickness of a disk device by improving a clamper structure of the disk device. An embodiment of the invention will be hereinafter explained.

An embodiment as a best mode for carrying out the invention will be hereinafter explained with reference to FIGS. 1 to 6. It goes without saying that the invention is readily applicable to matters other than those explained in the embodiment without departing from the spirit of the invention.

Figure 6:
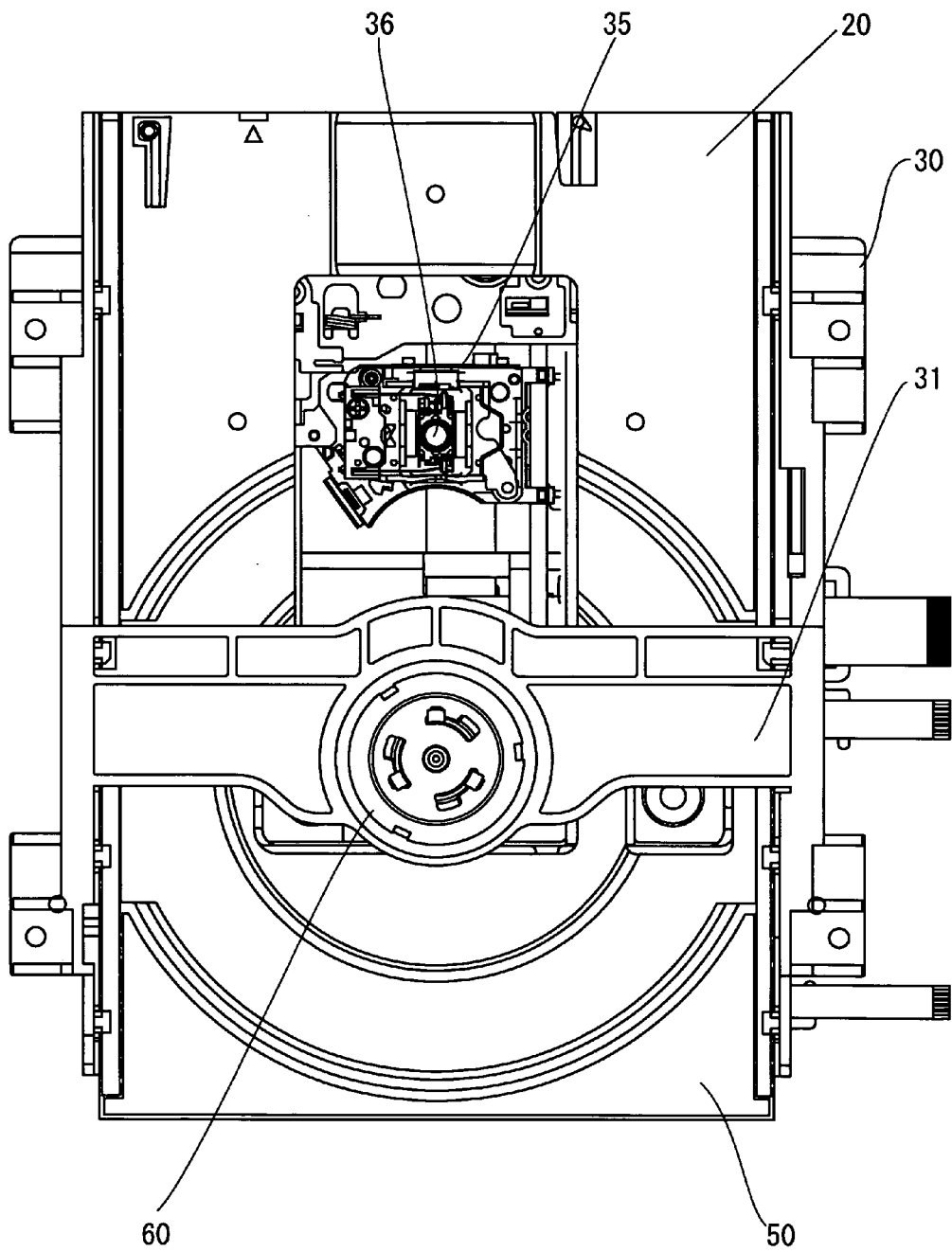
FIG. 6 is a plan explanatory view showing a DVD disk device in the invention.
Figure 7:
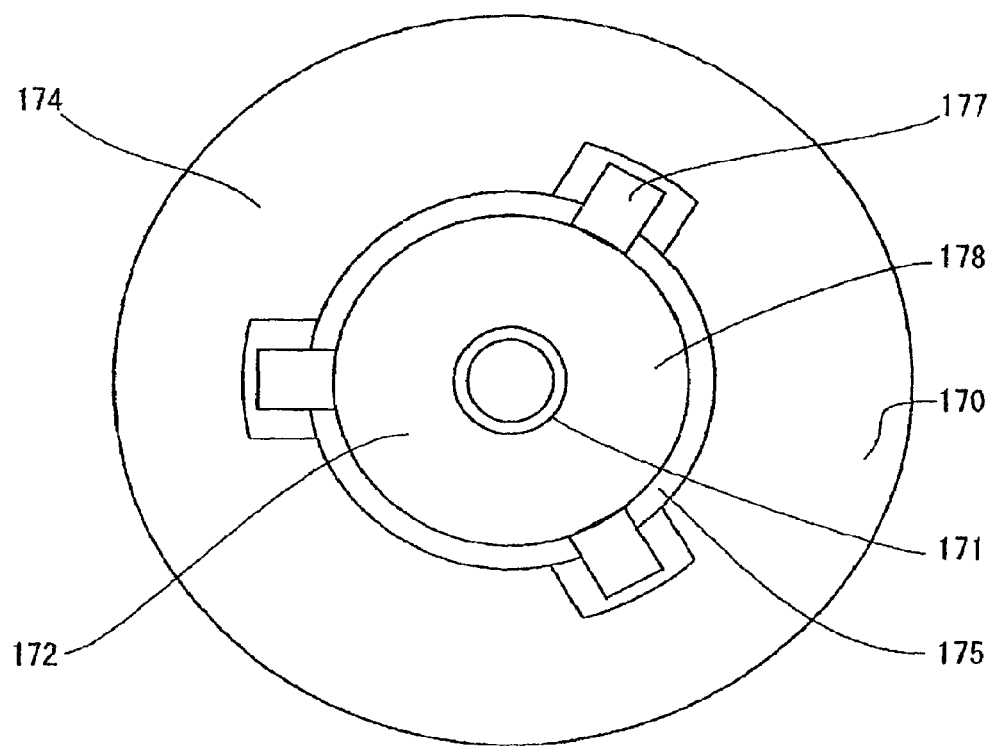
FIG. 7 is a plan explanatory view and a side sectional explanatory view showing a clamper body constituting a conventional clamper.
Figure 7:
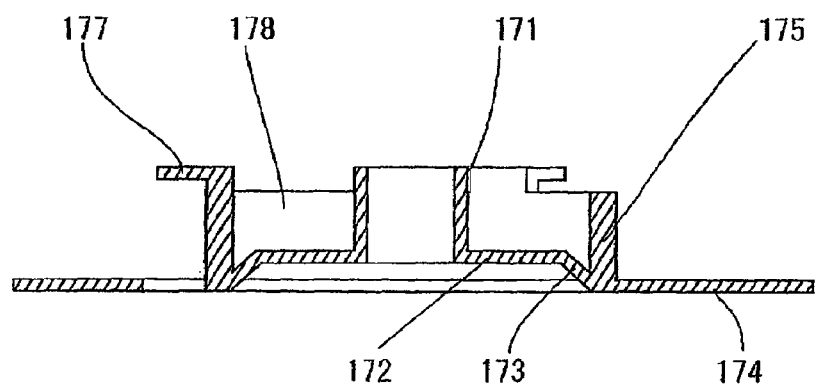
Figure 8:
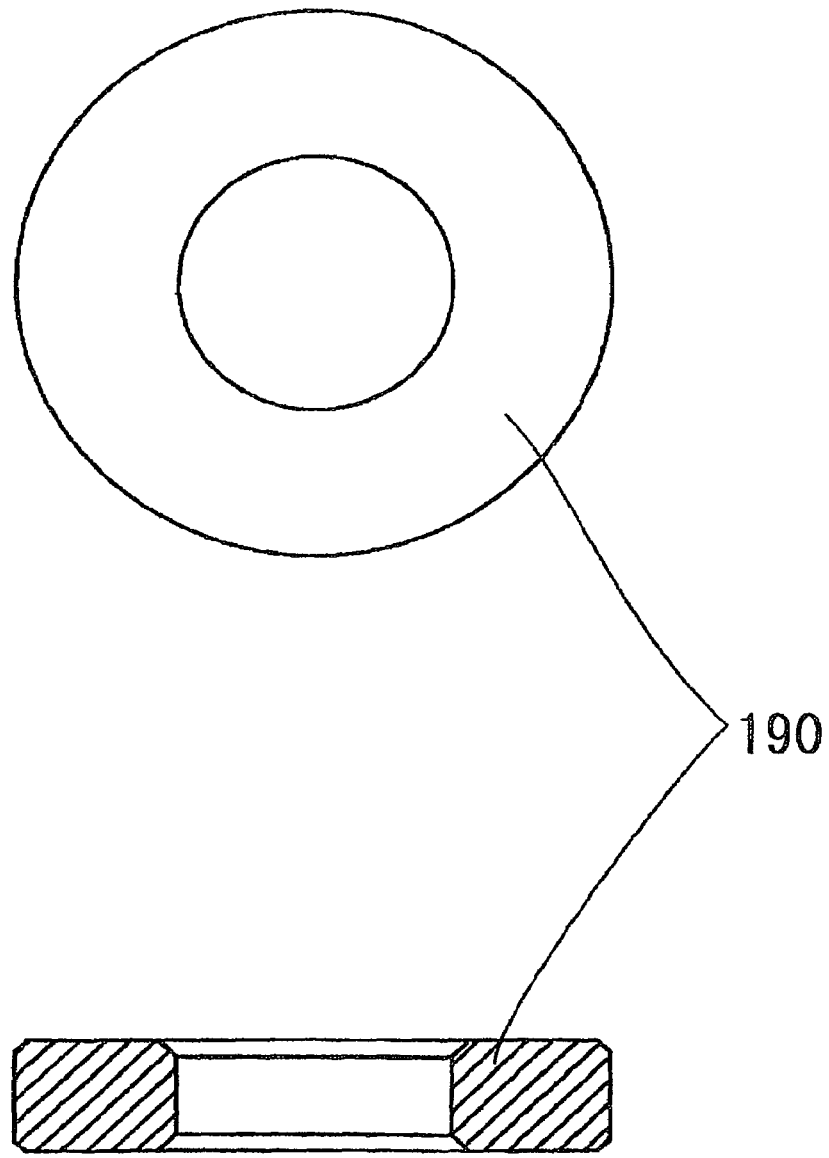
FIG. 8 is a plan explanatory view and a side sectional explanatory view showing a magnet constituting the conventional clamper.
Figure 9:
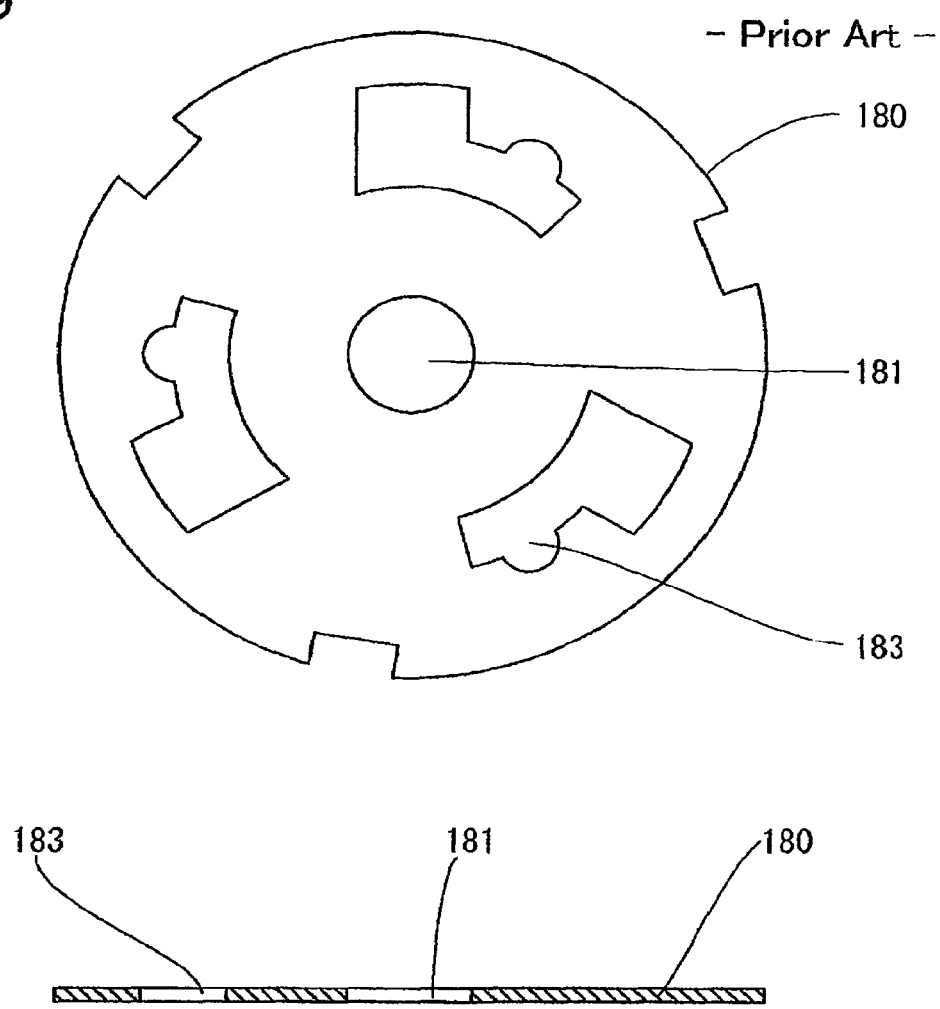
FIG. 9 is a plan explanatory view and a side sectional explanatory view showing a clamper plate constituting the conventional clamper.

FIG. 6 is a plan view showing a disk device built in a television.

The disk device shown in FIG. 6 is a DVD disk device 20 built in a not-shown television and is formed of resin. A clamper support section 31 is formed in an upper part of a frame 30 that supports the DVD disk device 20. A clamper 60 is arranged substantially in the center of the clamper support section 31. The clamper 60 is loosely fit in the clamper support section 31 to turn freely and supported. A tray 50 that is guided by the frame 30 and conveys a not-shown recording medium is arranged. A user can insert a recording medium, which is a DVD disk, in the television having the DVD disk device 20 built therein and view information recorded in the DVD disk.

Figure 1:
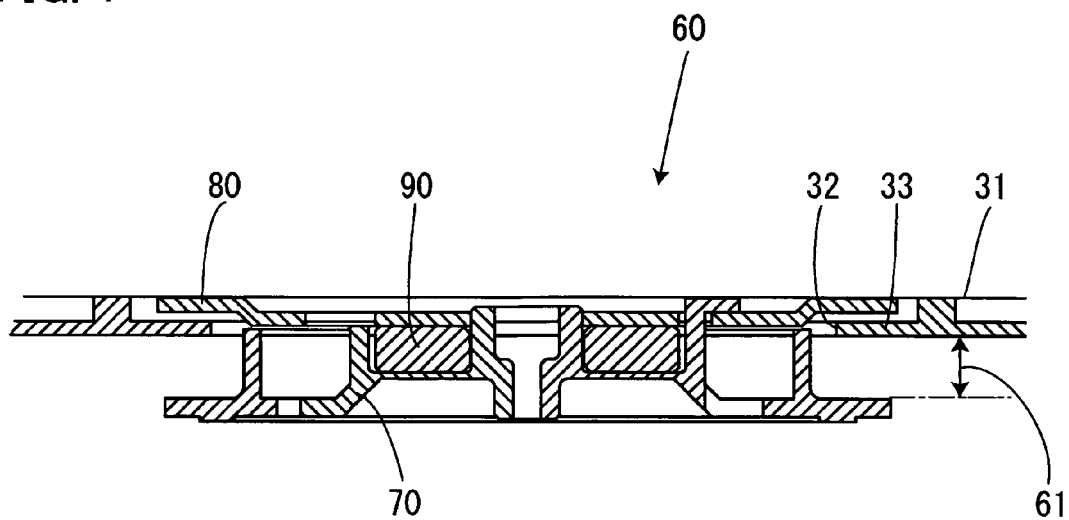
FIG. 1 is a sectional explanatory view showing a clamper and a clamper support section in an embodiment of the invention.
Figure 2:
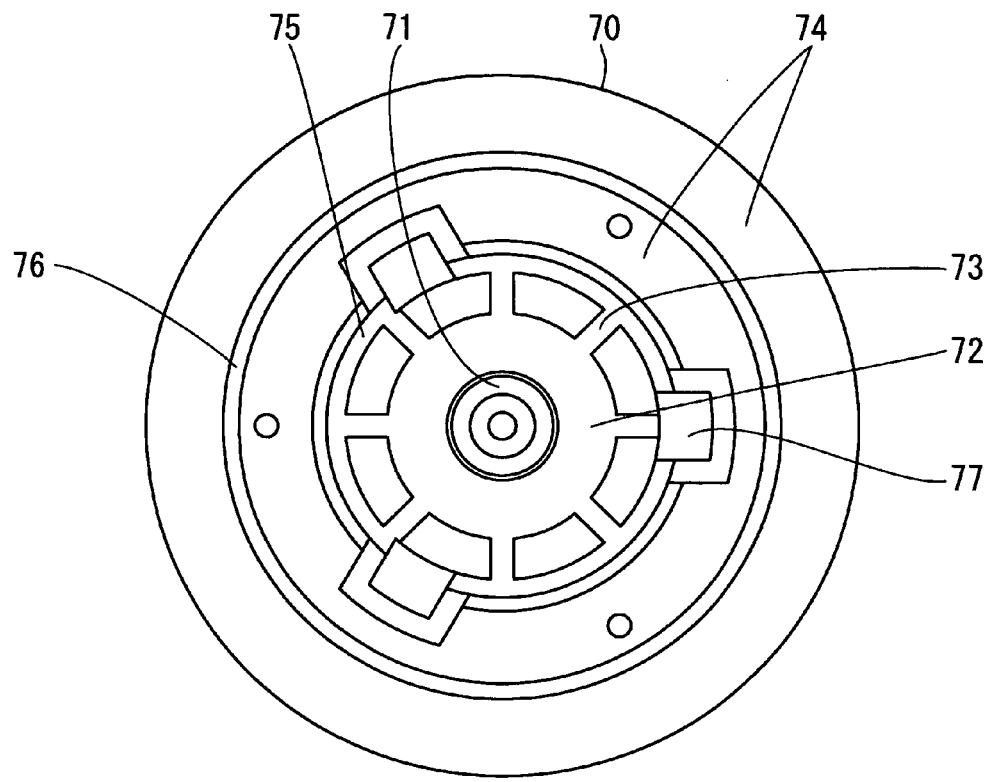
FIG. 2 is a plan explanatory view and a side sectional explanatory view showing a clamper body constituting a clamper in the invention.
Figure 2:
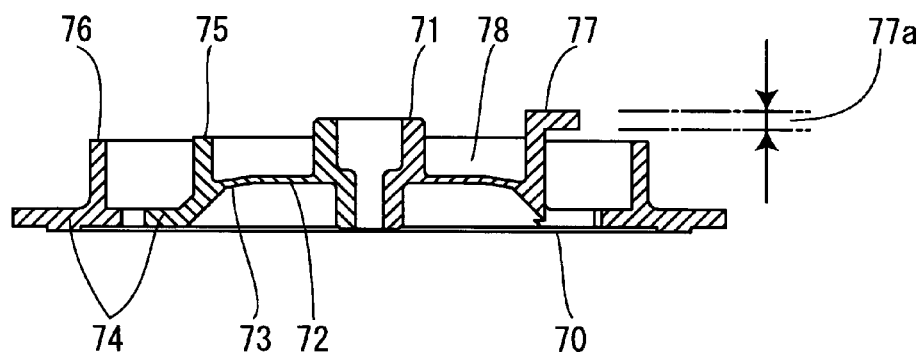
Figure 3:
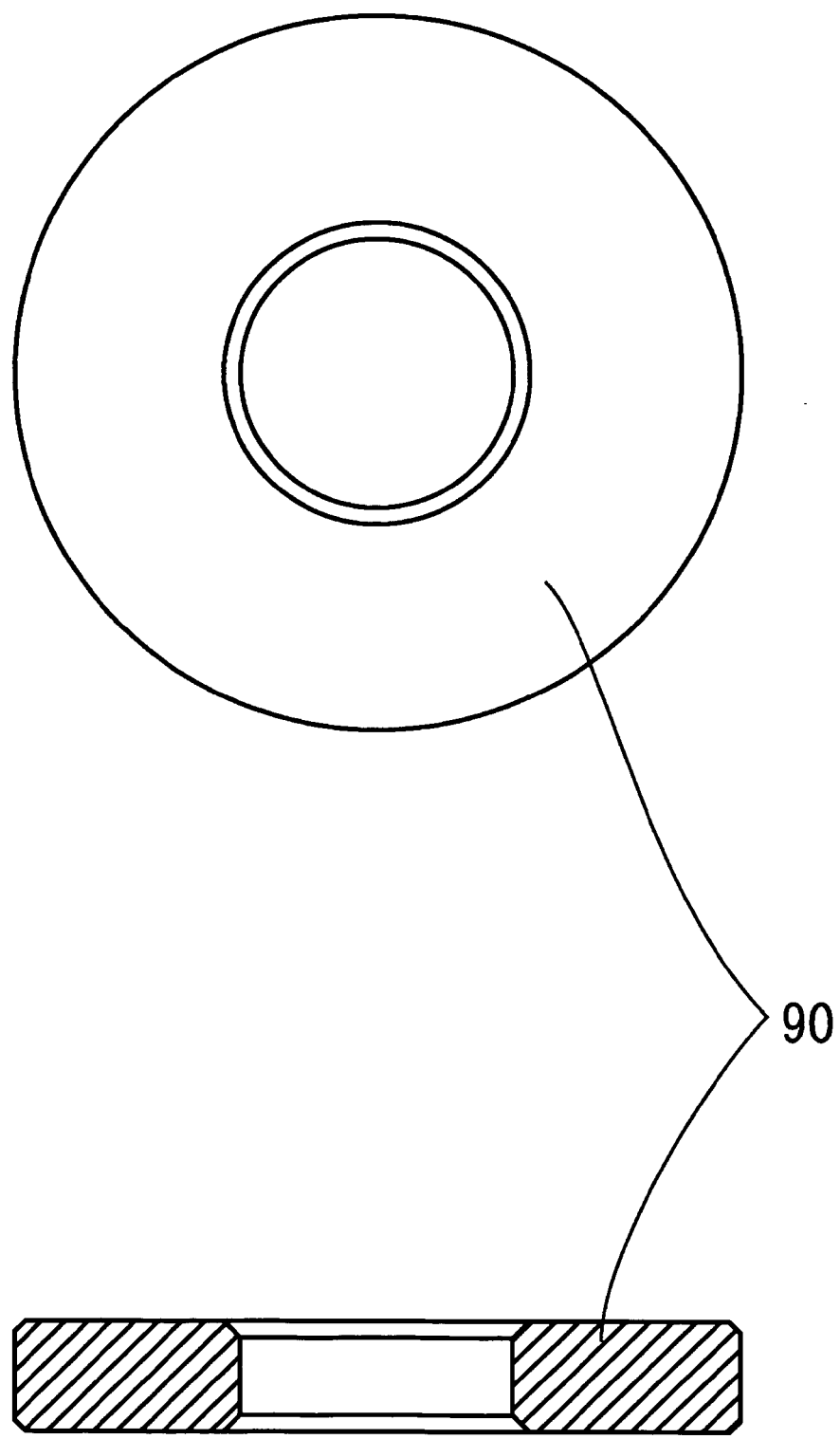
FIG. 3 is a plan explanatory view and a side sectional explanatory view showing a magnet constituting the clamper in the invention.
Figure 4:
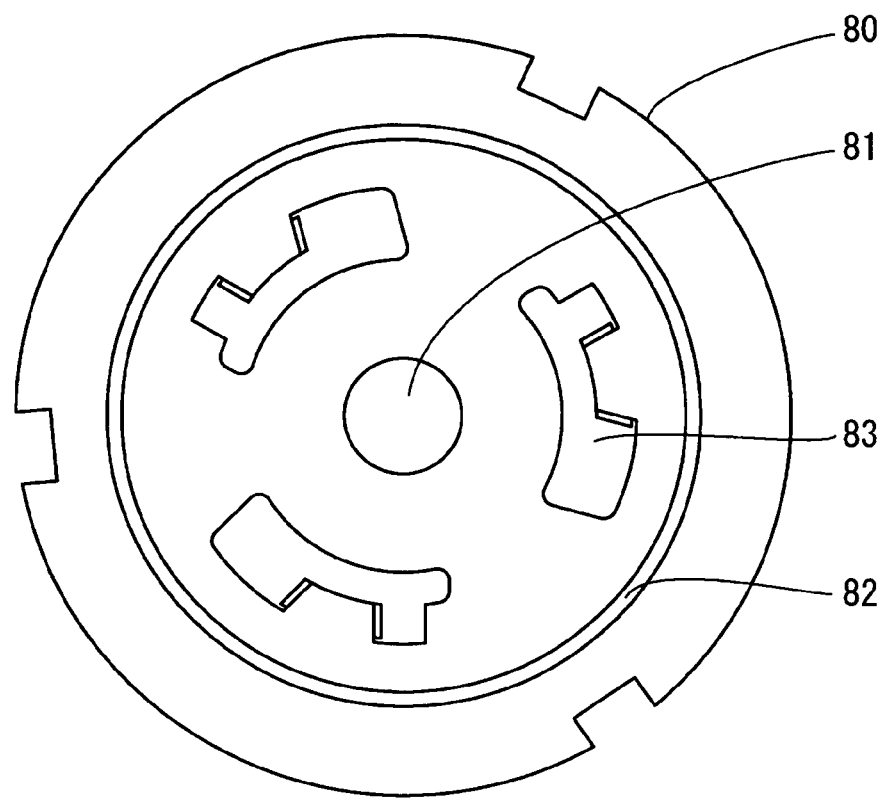
FIG. 4 is a plan explanatory view and a side explanatory view showing a clamper plate constituting the clamper in the invention.
Figure 4:
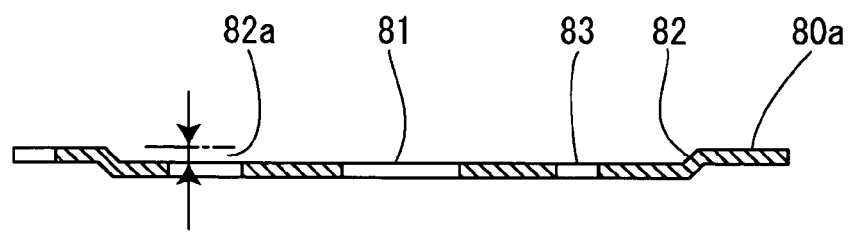

FIG. 1 is a sectional view showing a clamper and a clamper support section that supports the clamper. FIGS. 2 to 4 are plan views and side sectional views showing members constituting the clamper. FIG. 2 is a plan view and a side sectional view of a clamper body. FIG. 3 is a plan view and a side sectional view of a magnet. FIG. 4 is a plan view and a side sectional view of a clamper plate. A constitution of the clamper in this embodiment will be explained with reference to FIGS. 1 to 4.

The clamper 60 shown in FIG. 1 includes a clamper body 70 formed of resin, a clamper plate 80 of substantially a disk shape formed of metal, and a magnet 90 that assumes a flat ring shape and is housed in the clamper body 70 to attract a metal surface of a not-shown turntable to thereby clamp a not-shown recording medium between a turntable and the clamper 60. Since the clamper 60 is opened, the clamper plate 80 is supported by a thin portion 33 formed around an opening 32 of the clamper support section 31 and droops.

On the clamper body 70 shown in FIG. 2, a guide section 71 of substantially a cylindrical shape that pierces through the flat clamper plate 80 and guides a position of the clamper body 70, an inner torus 72 formed from the middle in a height direction of the guide section 71 toward the periphery of the clamper body 70, connecting sections 73 in eight places extending radially from the inner torus 72, an outer torus 74 formed around the connecting sections 73, an inner rim wall 75 of substantially a cylindrical shape extended upward from a boundary of the outer torus 74 and the connecting sections 73, an outer rim wall 76 of substantially a cylindrical shape extended upward from the inside of the outer torus 74, and L-shaped hook sections 77 in three places that are formed at an upper end of the inner rim wall 75 and engage with the clamper plate 80 are integrally formed around a rotational axis of the clamper body 70. A space between the guide section 71 and the rim wall 75 is used as a magnet housing section 78. Depth of the magnet housing section 78 is formed smaller than thickness of the magnet 90. The inner torus 72 and the outer torus 74 are formed with a step. The connecting sections 73 connecting the inner torus 72 and the outer torus 74 is formed aslant upward to the magnet housing section 78. The magnet housing section 78 houses the magnet 90 shown in FIG. 3 with the inner torus 72 as a bottom surface. The connecting sections 73 in eight places, which extend radially from the inner torus 72 and are formed aslant upward, can have a spring property. After the magnet 90 is housed in the magnet housing section 78 and the clamper plate 80 is assembled to the clamper body 70, the magnet 90 can be maintained to be pressed against the clamper plate 80 by the connecting sections 73 having the spring property. Thus, it is possible to prevent the problem in that the magnet 90 moves up and down in a gap in the magnet housing section 78 to generate odd sound every time the clamper 60 moves up and down according to an action for clamping or releasing a now-shown recording medium. It is unnecessary to provide means for preventing movement of the magnet 90 separately from the members constituting the clamper 60. Thus, it is possible to constitute the clamper 60 while keeping the number of components minimum. In addition, since the movement preventing means for the magnet 90 is formed integrally, it is possible to easily perform assembly work for the clamper 60.

In the clamper plate 80 shown in FIG. 4, a through-hole 81 piercing through the guide section 71 provided on the clamper body 70 is formed. A step section 82, an outer peripheral side of which is high upward, is formed in a position where an upper end of the outer rim wall 76 collides with the clamper plate 80. Consequently, when the guide sections 71 are pierced through the through-hole 81 of the clamper plate 80 as position guides and assembled with the clamper body 70 to engage with the L-shaped hook sections 77 in an engaging holes 83, even if it is attempted to insert the clamper body 70 with the front and the rear thereof reversed, the step section 82 collides with an end of the outer rim wall 76 earlier to make it impossible to engage the L-shaped hook sections 77. Thus, it is possible to prevent the clamper body 70 from being attached with the front and the rear thereof reversed. Consequently, it is possible to prevent the problem in that, since the clamper plate 80 is die-cut by a not-shown press die, burrs tend to be formed in a thickness direction on a rim surface of the clamper plate 80, a burr rim surface 80a of the clamper plate 80 with the burrs comes into contact with the clamper plate 80 to be shaved every time the burr rim surface 80a moves up and down according to a clamping action of the clamper 60, and fine powder shaved off from the clamper support section 31 formed of resin adheres to a lens 36 of a pickup 35 shown in FIG. 6 to scatter light, making it impossible to read not-shown fine signal bits formed on a surface of a recording medium 25 shown in FIG. 5. The engaging holes 83 in three places with which the L-shaped hook sections 77 engage are formed on the clamper plate 80. A step dimension 82a of a step of the step section 82 is formed larger than thickness 77a of the L-shaped hook sections 77 formed on the clamper body 70. Thus, after the clamper body 70 is assembled, it is possible to increase at least a stroke 61 shown in FIG. 1 equivalent to thickness of the L-shaped hook sections 77. Therefore, it is possible to increase thickness of the thin portion 33 formed in the opening 32 of the clamper support section 31 by the increase of the stroke 61, that is, an amount equivalent to the thickness 77a of the L-shaped hook sections 77. It is possible to improve strength of the clamper support section 31. The L-shaped hook sections 77 are lower than an upper surface of the clamper plate 80. It is possible to reduce thickness of the DVD disk device 20 by at least the thickness 77a of the L-shaped hook sections 77. Thus, it is possible to perform both a reduction in thickness of the DVD disk device 20 and reinforcement of the clamper support section 31.

Figure 5:
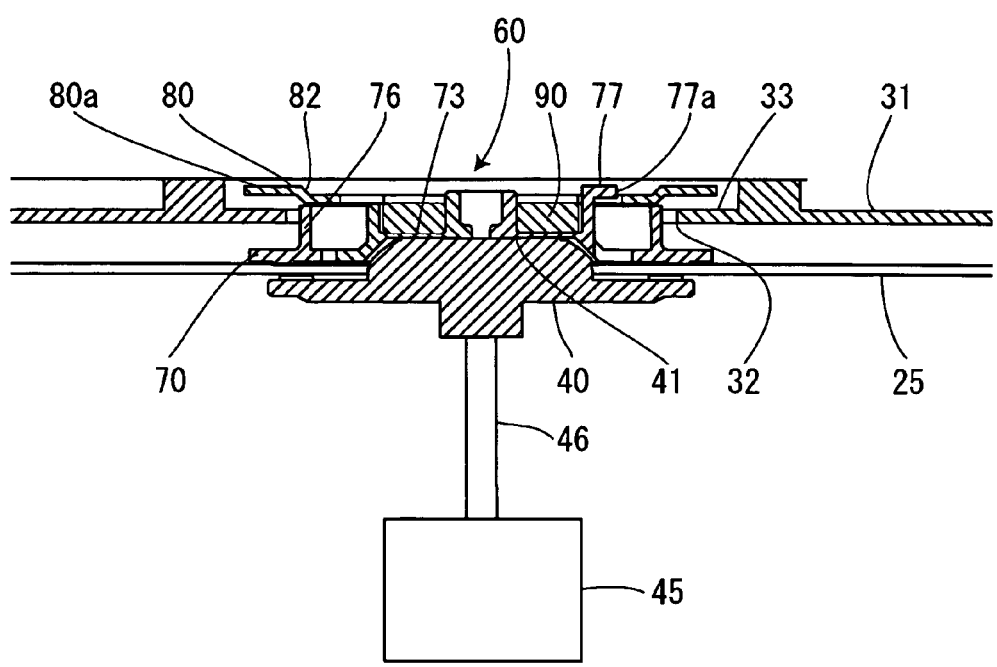
FIG. 5 is a side sectional explanatory view showing a state in which a recording medium in the invention is clamped by the clamper.

This embodiment will be explained with reference to a side sectional view in FIG. 5 showing a state in which a recording medium inserted in a DVD disk device is placed on a turntable and clamped by the clamper.

In the DVD disk device 20 shown in FIG. 5, a turntable 40 that is coupled to a rotation shaft 46 of a motor 45 driving rotation and on which the recording medium 25 is placed is in a raised position. The recording medium 25 is placed on the turntable 40. On the other hand, in the clamper 60, the clamper plate 80 is released from support by the clamper support section 31 according to rise of the turntable 40. The magnet 90 arranged in the clamper 60 attracts a metal surface 41 of the turntable 40 to thereby clamp the recording medium 25. The magnet 90 maintained to be pressed against the clamp plate 80 by the spring property of the connecting sections 73 is prevented from moving to generate odd sound every time the clamper 60 moves up and down. Since the step section 82 is provided in the clamper plate 80, when the clamper plate 80 is assembled with the clamper body 70, even if it is attempted to insert the clamper body 70 with the front and the rear thereof reversed, the step section 82 collides with an upper end of the outer rim wall 76 earlier to make it impossible to engage the L-shaped hook sections 77. Thus, it is possible to prevent the clamper body 70 from being attached with the front and the rear thereof reversed. Consequently, it is possible to prevent the problem in that, since the clamper plate 80 is die-cut by a not-shown press die, burrs tend to be formed in a thickness direction on a rim surface of the clamper plate 80, the burr rim surface 80a of the clamper plate 80 with the burrs comes into contact with the clamper plate 80 to be shaved every time the burr rim surface 80a moves up and down according to a clamping action of the clamper 60, and fine powder shaved off from the clamper support section 31 formed of resin adheres to the lens 36 of the pickup 35 shown in FIG. 6 to scatter light, making it impossible to read not-shown fine signal bits formed on the surface of the recording medium 25 shown in FIG. 5. The step section 82 of the clamper plate 80 is formed larger than the thickness 77a of the L-shaped hook sections 77 formed on the clamper body 70. Thus, after the clamper body 70 is assembled, it is possible to increase at least the stroke 61 shown in FIG. 1 equivalent to the thickness 77a of the L-shaped hook sections 77. Therefore, it is possible to increase thickness of the thin portion 33 formed in the opening 32 of the clamper support section 31 by the increase of the stroke 61, that is, an amount equivalent to the thickness 77a of the L-shaped hook sections 77. It is possible to improve strength of the opening 32 of the clamper support section 31. The L-shaped hook sections 77 are lower than the upper surface of the clamper plate 80. It is possible to reduce thickness of the DVD disk device 20 by at least the thickness 77a of the L-shaped hook sections 77. Thus, it is possible to perform both a reduction in thickness of the DVD disk device 20 and reinforcement of the clamper support section 31. Therefore, it is possible to reduce a size of an electronic apparatus having the DVD disk device 20 reduced in a size built therein.

The embodiment has been described in detail. However, the invention is not limited to the embodiment and various modifications of the invention are possible without departing from the spirit of the invention. For example, the electronic apparatus having the DVD disk device 20 built therein is not limited to a television and may be any electronic apparatus as long as the electronic apparatus has built therein the DVD disk device 20 such as a DVD recording/reproducing device or a complex recording/reproducing device of an HDD and a DVD and is capable of performing recording or recording and reproduction. Shapes of the L-shaped hook sections 77 and the engaging holes 82 and positions where the L-shaped hook sections 77 and the engaging holes 82 are arranged only have to be shapes and positions with which it is possible to prevent the clamper plate 80 provided with the step section 82 from being inserted with the front and the rear thereof reversed. The shapes and the positions are not limited to the embodiment and may be selected according to circumstances, for example, may be changed taking into account arrangement at the time of designing and convenience of assembly.

The effect of the present invention is as follows.

According to the invention in claim 1, in the electronic apparatus including a disk device including: a tray that conveys a disk-like recording medium to the inside and the outside of the device; a frame of a device body that houses the tray; a turntable that rotates while supporting the recording medium conveyed to the inside of the device together with the tray from below; a clamper support section that is formed in an upper part of the frame to be opposed to the turntable; and a clamper that loosely fits in the clamper support section to turn freely, the disk device rotating the recording medium, which is conveyed to the inside of the device by the tray, to perform reading and writing of information in a state in which the recording medium is clamped by the turntable and the clamper, the clamper includes: a clamper body formed of resin; a clamper plate of substantially a disk shape formed of metal; and a magnet that is housed in the clamper body and attracts a metal surface of the turntable, and a magnet housing section for housing the magnet, engaging means that engages with the clamper plates and movement preventing means for the magnet housed in the magnet housing section are integrally formed on the clamper body. Consequently, it is unnecessary to provide the movement preventing means for the magnet separately from the members constituting the clamper. Thus, it is possible to constitute the clamper while keeping the number of components minimum. In addition, since the movement preventing means is formed integrally, it is possible to easily perform assembly work for the clamper.

According to the invention in claim 2, a guide section of substantially a cylindrical shape that pierces through the clamper plate and guides a position of the clamper plate, an inner torus that is formed from the guide section toward the periphery of the clamper body, and an inner rim wall of substantially a cylindrical shape extending upward from the inner torus are formed around a rotation axis of the clamper body as the magnet housing section. Consequently, it is possible to easily assemble the clamper body and the clamper plate that are guided by the guide section and the through-hole. It is possible to assemble the magnet, which is arranged in the magnet housing section, in a predetermined position that has the inner torus as a bottom surface and is surrounded by the guide section and the inner rim wall.

According to the invention in claim 3, the inner torus, plural connecting sections extending radially from the inner torus, and an outer torus formed around the connecting sections are integrally formed, the inner torus and the outer torus are formed with a step, the connecting sections are formed aslant upward from the outer torus toward the inner torus, and depth of the magnet housing section is formed smaller than thickness of the magnet to form movement preventing means for the magnet. Consequently, the plural connecting sections aslant upward can have a spring property. Thus, the magnet is pressed into and housed in the magnet housing section formed shallow. After the clamper plate is assembled to the clamper body, the magnet can maintain a state in which the magnet is pressed against the clamper plate by with the connecting sections having the spring property. Consequently, it is possible to prevent the problem in that the magnet moves up and down in a gap in the magnet housing section to generate odd sound every time the clamper moves up and down according to an action for clamping or releasing a recording medium.

According to the invention in claim 4, an inner rim wall of substantially a cylindrical shape extended upward from a boundary of the outer torus and the connecting sections, an outer rim wall of substantially a cylindrical shape extended upward from an inner side of the outer torus, and plural L-shaped hook sections at an upper end of the inner rim wall are integrally formed on the clamper body, and a through-hole through which a guide section provided in the clamper body pierces and plural engaging holes with which the L-shaped hook sections engage are formed in the clamper plate to form engaging means for the clamper plate. Consequently, the clamper plate can cause the guide sections formed in the clamper body to pierce through the through-hole and insert the L-shaped hook sections through the engaging holes. The magnet housed in the magnet housing section is always pressed against the clamper plate by the plural connecting sections having the spring property and the clamper plate engaged by the plural L-shaped hook and can maintain a movement prevented state. Thus, it is possible to prevent, over a long period, the problem in that the magnet moves up and down in a gap in the magnet housing section to generate odd sound every time the clamper moves up and down according to an action for clamping or releasing a recording medium.

According to the invention in claim 5, in the clamper plate, a step section, an outer peripheral side of which is high upward, is formed in a position where an upper end of the outer rim wall of the clamper body collides with the clamper plate. Consequently, when the clamper plate is assembled with the clamper body with the step formed in the clamper pate, even if it is attempted to insert the clamper plate with the front and the rear thereof reversed, the step section collides with an end of the outer rim wall earlier to make it impossible to engage the L-shaped hook sections. Thus, it is possible to prevent the clamper plate from being attached with the front and the rear thereof reversed. Consequently, it is possible to prevent the problem in that, since the clamper plate is die-cut by a press die, burrs in a thickness direction tend to be caused in a rim surface of the clamper plate, the rim surface of the clamper plate with the burrs comes into contact with the clamper plate to be shaved every time the rim surface moves up and down according to a clamping action of the clamper, and fine powder shaved off from the clamper plate formed of resin adheres to a lens of a pickup to scatter light, making it impossible to read fine signal bits formed on a surface of a recording medium.

According to the invention in claim 6, the step section of the clamper plate is formed larger than thickness of the L-shaped hooks formed in the clamper body. Consequently, after the clamper body is assembled, at least a stroke equivalent to thickness of the L-shaped hook sections increases. Thus, it is possible to increase thickness of the clamper support section by an amount equivalent to the increase in the stroke, that is, an amount equivalent to the thickness of the L-shaped hook sections. Therefore, it is possible to improve strength of the clamper support section. In addition, the L-shaped hooks are lower than an upper surface of the clamper plate. Thus, it is possible to reduce thickness of the disk device by at least thickness of the L-shaped hooks. Therefore, it is possible to perform both a reduction in thickness of the disk device and reinforcement of the clamper support section.

What is claimed is:

1. An electronic apparatus including a disk device comprising: a tray that conveys a disk-like recording medium to an inside and an outside of the device; a frame of a device body that houses the tray; a turntable that rotates while supporting the recording medium conveyed to the inside of the device together with the tray from below; a clamper support section that is formed in an upper part of the frame to be opposed to the turntable; and a clamper that loosely fits in the clamper support section to turn freely, the disk device rotating the recording medium, which is conveyed to the inside of the device by the tray, to perform reading and writing of information in a state in which the recording medium is clamped by the turntable and the clamper, characterized in that the clamper includes: a clamper body formed of resin; a clamper plate of substantially a disk shape formed of metal; and a magnet that is housed in the clamper body and attracts a metal surface of the turntable, and a magnet housing section for housing the magnet, engaging means that engages with the clamper plate, and movement preventing means for the magnet housed in the magnet housing section are integrally formed on the clamper body.

2. The electronic apparatus including a disk device according to claim 1, characterized in that a guide section of substantially a cylindrical shape that pierces through the clamper plate and guides a position of the clamper plate, an inner torus that is formed from the guide section toward the periphery of the clamper body, and an inner rim wall of substantially a cylindrical shape extending upward from the inner torus are formed around a rotation axis of the clamper body as the magnet housing section.

3. The electronic apparatus including a disk device according to claim 2, characterized in that the inner torus, plural connecting sections extending radially from the inner torus, and an outer torus formed around the connecting sections are integrally formed, the inner torus and the outer torus are formed with a step, the connecting sections are formed aslant upward from the outer torus toward the inner torus, and depth of the magnet housing section is formed smaller than thickness of the magnet to form movement preventing means for the magnet.

4. The electronic apparatus including a disk device according to claim 3, characterized in that an inner rim wall of substantially a cylindrical shape extended upward from a boundary of the outer torus and the connecting sections, an outer rim wall of substantially a cylindrical shape extended upward from an inner side of the outer torus, and plural L-shaped hook sections at an upper end of the inner rim wall are integrally formed on the clamper body, and a through-hole through which a guide section provided in the clamper body pierces and plural engaging holes with which the L-shaped hook sections engage are formed in the clamper plate to form engaging means for the clamper plate.

5. The electronic apparatus including a disk device according to claim 4, characterized in that, in the clamper plate, a step section, an outer peripheral side of which is high upward, is formed in a position where an upper end of the outer rim wall of the clamper body collides with the clamper plate.

6. The electronic apparatus including a disk device according to claim 5, characterized in that the step section of the clamper plate is formed larger than thickness of the L-shaped hooks formed on the clamper body.

* * * * *